United States Patent [19]

Link

[11] 4,180,894
[45] Jan. 1, 1980

[54] AUTOMATIC TURRET LATHE

[75] Inventor: Helmut F. Link, Aichwald, Fed. Rep. of Germany

[73] Assignee: Index-Werke Kommanditgesellschaft Hahn & Tessky, Esslingen, Fed. Rep. of Germany

[21] Appl. No.: 929,726

[22] Filed: Jul. 31, 1978

[30] Foreign Application Priority Data

Aug. 20, 1977 [DE] Fed. Rep. of Germany ....... 2737664

[51] Int. Cl.² .......................... B23B 3/16; B23B 3/00; B23B 25/00; B23B 39/20
[52] U.S. Cl. ........................................ 29/36; 29/27 C; 82/2 R; 82/36 A; 82/39; 408/35
[58] Field of Search ............ 82/2 R, 36 R, 2 B, 36 A, 82/38 R, 39; 29/36, 27 C; 408/35

[56] References Cited

U.S. PATENT DOCUMENTS

| Re. 29,694 | 7/1978 | Foll et al. ................................. 29/36 |
| 3,691,613 | 9/1972 | Walk ..................................... 29/27 C |
| 3,943,802 | 3/1976 | Luebkemann et al. ................ 82/2 R |
| 3,955,257 | 5/1976 | Herbst et al. ............................ 29/36 |
| 4,051,750 | 10/1977 | Berly ..................................... 82/2 R |
| 4,058,034 | 11/1977 | Lahm et al. ............................ 82/2 R |
| 4,080,853 | 3/1978 | Goto ................................. 408/35 X |

FOREIGN PATENT DOCUMENTS

| 1037138 | 7/1966 | United Kingdom . |
| 1304245 | 1/1973 | United Kingdom . |
| 1304611 | 1/1973 | United Kingdom . |
| 1369145 | 10/1974 | United Kingdom . |
| 1381098 | 1/1975 | United Kingdom . |
| 1458163 | 12/1976 | United Kingdom . |

*Primary Examiner*—Harrison L. Hinson
*Attorney, Agent, or Firm*—Shenier & O'Connor

[57] ABSTRACT

An automatic turret lathe has a main and a supplementary tool-carrying turret both being jointly movable in longitudinal and transverse directions with the turrets being indexable about an indexing axis. The supplementary turret is of smaller diameter than the main turret. Turning tools can be placed in the turrets so that a tool in one turret forms a pair with a tool in the other turret, and the turrets arranged so that both inside and outside machining of a workpiece can be carried out simultaneously. Tools can be placed in the carriers in the turrets to carry out a particular desired function. The supplementary turret can be removed for machining shafts. The turrets can be moved towards and away from as well as along the lathe axis.

12 Claims, 7 Drawing Figures

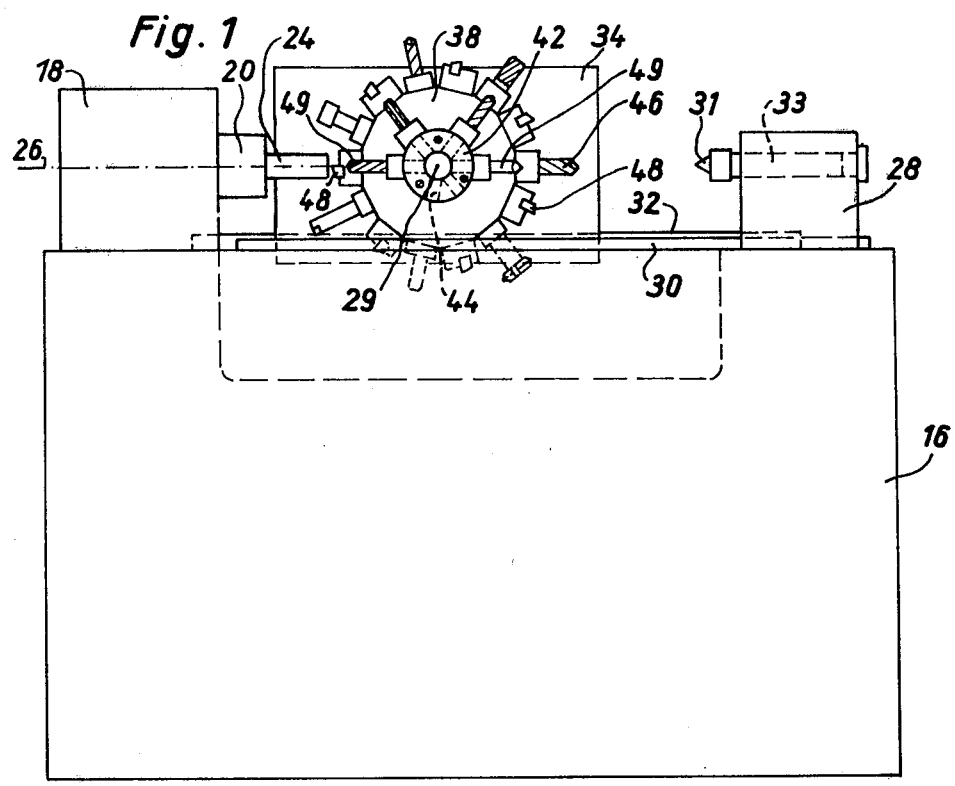
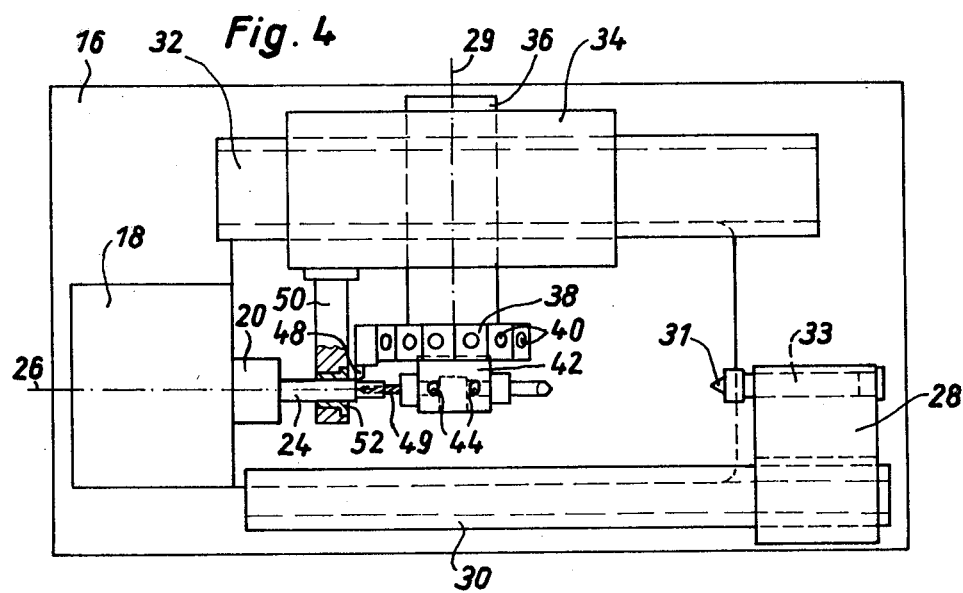

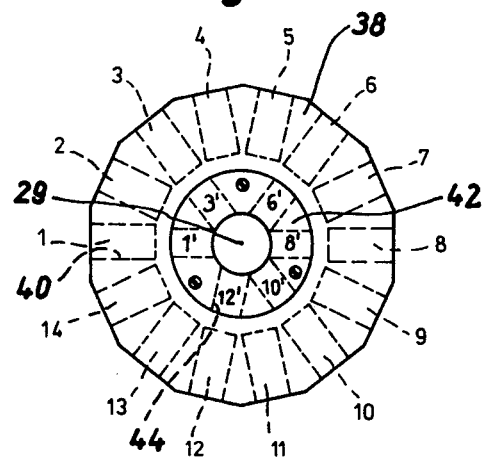
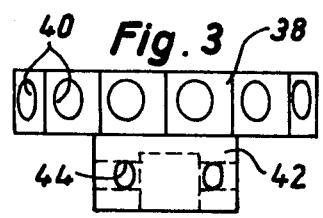
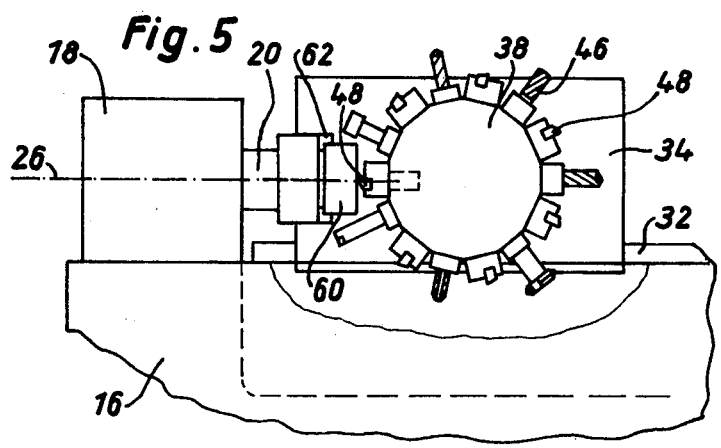

AUTOMATIC TURRET LATHE

FIELD OF THE INVENTION

This invention relates to an automatic turret lathe.

BACKGROUND OF THE INVENTION

It is already known to fit the turret of an automatic turret lathe with combination tools comprising an internal tool and an external tool. The tool holders pertaining thereto are however relatively complicated. Moreover, a satisfactory cutting position for the two tools can be attained only with difficulty.

It is already known to dispose two separate turrets one behind the other. However, as both have the same diameter, they are hardly suitable for combined tool use. In this known construction, if only one turret is needed, the other cannot be removed (German Auslegeschrift 19 52 050).

SUMMARY OF THE INVENTION

The object of the invention is to provide a turret arrangement with which it is possible to simultaneously machine with two tools using separate tool carriers and holders, but wherein the arrangement is such that its structure is suitable for different types of turning, such as bar machining, chuck machining and shaft machining.

According to the invention there is provided an automatic turret lathe comprising a bedplate, a main spindle for rotating a workpiece; a headstock on the bedplate carrying the main spindle; a main turret which is indexable about an indexing axis and has a plurality of main tool carriers; a removable supplementary turret disposed on the same indexing axis as the main turret and having a plurality of supplementary tool carriers arranged so as to form pairs with respective main tool carriers, the supplementary tool carriers being closer to the indexing axis than the main tool carriers; and a support on which both turrets are mounted and which is slidable in longitudinal and transverse directions on the bedplate.

By this means all tools or their tool holders can be inserted individually into their carriers, yet each tool of the supplementary turret can be combined with a tool of the main turret. Furthermore, the cutting edges of the two tools which are simultaneously in use can be brought into advantageous mutual positioning.

Due to the fact that the supplementary tool carriers are at a smaller distance from the indexing axis and the difference relative to the corresponding distance of the main tool carrier of the main turret is considerable because of the advantageous cutting edge arrangement, the main turret basically comprises more tool carriers than the supplementary turret. For all machining in which a combination of two tools is not necessary or is not possible, for example in shaft machining, the main turret can be used for turning work in the normal known manner after removing the supplementary turret.

In order to be able to carry out cylindrical turning, a material guide can be provided with a guide bush, fitted to a support which moves together with the turrets. By this means, internal machining can be carried out by the supplementary turret simultaneously with external machining by the main turret.

In this connection, it is significant that because of the substantially smaller radical distance of the supplementary tool carriers from the indexing axis, the internally machining tools of the supplementary turret and the externally machining tools of the main turret can be so disposed that their cutting edges are at approximately the same direction from the indexing axis. For cylindrical turning, it can also be advantageous if the distance of the externally machining tool from the indexing axis is slightly greater than that of the internally machining tool.

In using the two turrets, pairs of tool carriers can certainly be present which are fitted only with internally machining tools. In this case, in order to avoid collisions, the two tool holders of this pair of tool holders should be disposed at a distance apart in the direction of the indexing axis which is greater than the radius of the material chuck or of the largest workpiece.

In an advantageous construction, there is provided a longitudinal carriage slidable to and fro in a longitudinal direction on the bedplate, and both the two transversely mobile turrets and the material guide for guiding the working material are disposed on this longitudinal carriage.

Generally it is advantageous for the number of main tool carriers to be considerably greater than the number of supplementary tool carriers. However, it is advantageous for the main tool carriers not to be a whole multiple of the supplementary tool carriers. For example, the number of tool carriers is advantageously at least one tool carrier, and preferably an even number of tool carriers, greater than double the number of supplementary tool carriers. A desirable arrangement is one in which there are fourteen main tool carriers and six supplementary tool carriers.

In practically all types of machining with the exception of shaft machining, it is advantageous to insert internally machining tools and externally machining tools alternately in the main tool carriers. This leads to several advantages. In the first place, any danger of collision between neighbouring tools is avoided. Again, in collaboration with the supplementary turret, favourable cooperation between the tools of the two turrets can be attained. Furthermore, the tool pairs can be changed by changing over the externally machining tools of the main turret. This latter advantage can also be attained in that the supplementary turret can be shifted separately from the main turret. Overall, the automatic turret lathe according to the invention, including its preferable features, is suitable for practically all turning which is done on such machines, such as chuck machining, shaft machining using a tailstock, machining short cylindrical parts from bar stock, and machining long cylindrical parts from bar stock using a material guide. Suitable tool arrangements for these types of machining are known, such as for example a disc-type turret for shaft machining, a star-type turret for chuck machining, and a drum-type turret for long cylindrical machining. Instead of using these known types of construction, the automatic turret according to the invention, including its preferable features, is particularly suitable for all this work.

The importance of this universal use is closely connected with the fact that automatic turret lathes, in particular NC latches, are mostly used only for machining small batch runs for economical reasons. This leads to the requirement that such a lathe must have considerable flexibility. This is particularly true of small NC lathes, as the machining times of the workpieces prepared thereon are short. Such a machine can therefore be employed to full capacity only if a plurality of workpieces of the most difficult types can be prepared on such lathes.

Further advantages and characteristics of the invention will be apparent from the description given hereinafter of embodiments of the invention, with reference to the accompanying drawings.

BRIEF DESCRIPTION OF THE DRAWINGS

FIG. 1 is a front view of an automatic turret lathe according to the invention illustrating the machining of short cylindrical parts;

FIG. 2 is a front view of the two turrets of FIG. 1 without tools and to a larger scale than FIG. 1;

FIG. 3 is a plan view of FIG. 2;

FIG. 4 is a plan view of an automatic turret lathe according to the invention illustrating long cylindrical machining;

FIG. 5 is a partial front view of FIG. 1 or 2 with the supplementary turret removed, illustrating the machining of a large chuck part;

DETAILED DESCRIPTION OF THE PREFERRED EMBODIMENT

Figure 6:
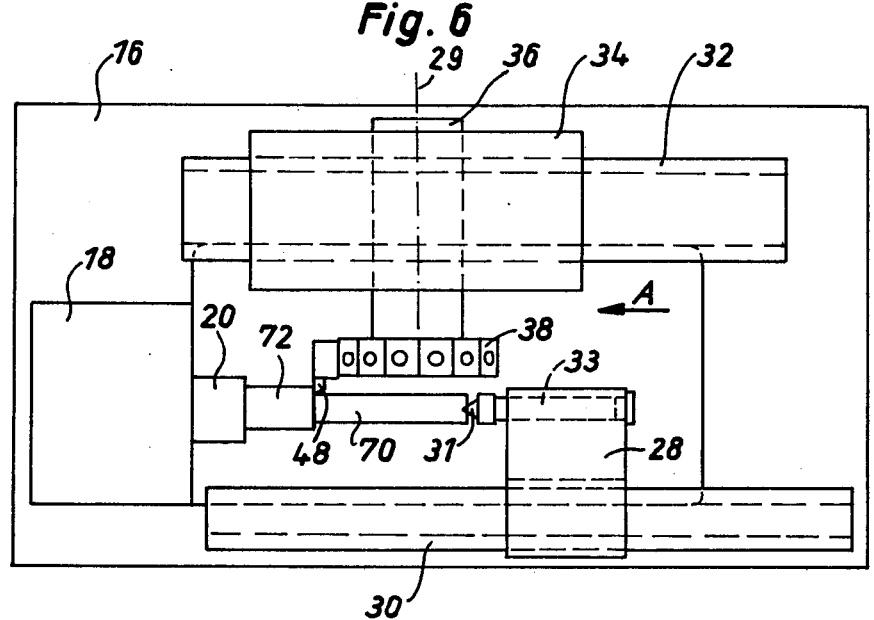
FIG. 6 is a plan view of FIG. 4 with the supplementary turret removed, illustrating the machining of shafts.

In the embodiment shown in FIGS. 1 to 3, a bedplate is indicated by 16, on which a headstock 18 is fixed, to take the rotatable main spindle, the spindle head being indicated by 20. A chuck, not shown, is fitted thereon, in which a workpiece 24 is clamped. The spindle axle is indicated by 26.

Opposite the headstock there is provided a tailstock 28, comprising a tail spindle 33 with a tail centre 31. The tailstock is longitudinally slidable on a guide 30, disposed on the front cheek of the bedplate. From FIG. 7 it can be seen that the tailstock is in the special shape of a projecting arm.

A longitudinal carriage 34 is longitudinally slidable on a carriage guide 32 on the rear cheek of the machine bed, and a holder 36 (see FIG. 4) is transversely slidable in the carriage 34 and carries on its front end a main turret 38, possessing a total of fourteen main tool carriers or stations 40 (see FIGS. 2 and 3). A supplementary turret 42 is provided with supplementary tool carriers or stations 44 is removably disposed on the front of this main turret 38. This supplementary turret has a substantially smaller circumference than the main turret, so that the distance between the supplementary tool carrier and the indexing axis is considerably smaller, and preferably less than half, the distance between the main tool carriers and the main axis.

The supplementary turret is preferably fitted with internally machining tools, of which only four are shown in FIG. 1. As clearly shown in FIG. 2 a main tool carrier 40 is always associated with each supplementary tool carrier 44, so as to form pairs of tool carriers and thus tool pairs when tools are inserted. A pair consisting of dissimilar tools will be known as a first pair, and in FIG. 1 two first pairs are present. A pair with similar tools will be known as a second pair, and two second pairs are shown in FIG. 1.

A workpiece can be machined, as with a combination tool, by the first pairs of tools, as will be described hereinafter. In this, it is advantageous if the cutting edges of the two tools as seen in front view in FIG. 1 lie at approximately the same distance from the indexing axis 29 of the two turrets, or, in other words, lie approximately on the same trajectory circle. However, in FIG. 1, the internally machining tools of the supplementary turret are somewhat shortened for clarity in the Figure.

It should be mentioned also that the support which supports the turrets and which comprises the longitudinal carriage 34 and holder 36 can be formed in another manner, and for example can comprise a lower and upper carriage in the manner of a cross carriage. It is merely essential that the turrets can move in the longitudinal and transverse directions.

The two turrets 38 and 42 are formed in the manner of horizontal turrets, and can be indexed stepwise about the indexing axis 29, which is transverse to the spindle axis 26 and cuts this latter. The two turrets can be indexed either together or advantageously individually by means of an indexing device, not shown.

In the embodiment shown in FIG. 1, the main turret is fitted alternately with internally machining tools 46 and externally machining tools 48. These tools are held in tool holders, which in their turn engage in the corresponding carriers. However, for the sake of simplicity, hereinafter, in the case of both turrets, the description will only make reference to "tools," and this expression is also understood to include the respective tool holders. The distance between the tool carriers of the two turrets in the direction of the indexing axis should not be too large, so as to be able to machine with two tools in the manner of a combination tool in the case of the first pairs. However, this distance should also be large enough so that when machining with the internally machining tools of the second pairs, the respective tool which is not being used remains free from the workpiece and from the workpiece clamp with the spindle head. In this respect, care should also be taken that the clamping device and the spindle head not only have an appropriate small circumference, but also have an appropriate axial length such that the internally machining tools of the supplementary turret can be fully used for machining.

FIGS. 2 and 3 are a front and plan view to an enlarged scale of the two turrets, but without tools. The main tool carriers are indicated by the reference numerals 1 to 14, and the supplementary tool carrier by the reference numerals 1', 3', 6', 8', 10', 12'.

If it is now assumed that the main turret 38 of FIG. 1 is fitted alternately with internally and externally machining tools, and the supplementary turret 42 carries six internally machining tools 49, then there are two first pairs 1, 1' and 3, 3', and four second pairs, namely 6, 6', 8, 8', 10, 10' and 12, 12'. Thus a combined machining is possible in two positions.

In order to bring the internally machining tools of the four second pairs into full machining, it is necessary, as already heretofore stated, for the distance between the two turrets in the axial direction to be sufficient, and for the circumference and length dimensions of the chuck and spindle head to be such that machining can be carried out free from collisions.

The relationships between first and second pairs can be interchanged by moving all tools of the main turret through one station, or, in the case of separately indexable turrets, by indexing one of the two turrets through one step.

In FIG. 4 and the remaining figures, parts analogous to those of FIGS. 1 to 3 are indicated with the same reference numerals.

In FIG. 4, a support 50 is fixed on the longitudinal carriage 34 and carries a guide bush 52, in which a bar-shaped work-piece 24 is guided. The workpiece is clamped in a chuck, not shown, in the spindle head 20.

Only a few tools are disposed on the two turrets for better visibility. It can be seen that a first pair comprising an externally machining tool 48 on the main turret 38 and an internally machining tool 49 on the supplementary turret 42 simultaneously machine the front end of the bar. As in this case the chips are removed in the manner of long cylindrical machining, it is particularly important for the cutting edges of the two simultaneously machining tools to be at approximately the same distance from the indexing axis, or in other words, approximately on the same trajectory circle, and to lie close to the guide bush 52. In the case of long cylindrical machining, it can be advantageous for the cutting insert of the internally machining tool to lie a very small distance behind the cutting insert of the externally machining tool.

FIG. 5 shows that when machining a workpiece 60 of large diameter, which is held in a chuck 62, the supplementary turret is mostly unusable, and can therefore be removed.

Figure 7:
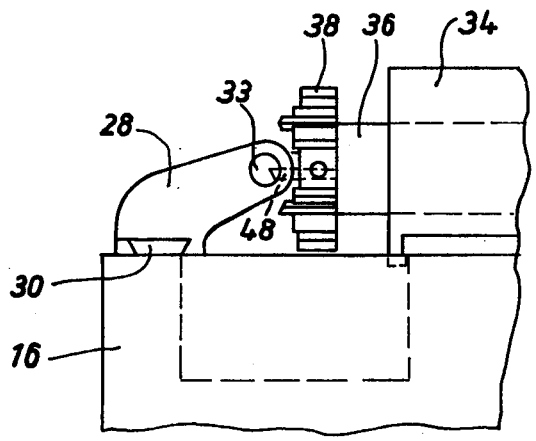
FIG. 7 is a partial side view in the direction of the arrow A of FIG. 6, with the headstock removed.

FIGS. 6 and 7 show the use of the automatic turret lathe for shaft machining. The end of the shaft 70 is held with a chuck 72, and the other end is held in the centre 31 of the tail spindle 33 of the tail-stock 28. In this case the supplementary turret 42 is removed, and the main turret 38 is fitted with externally machining tools, of which only one is shown.

FIG. 7 shows a special form of the tailstock. It can be seen that when machining the total length of the shaft, the tool carrier lying opposite the machining tool on the main turret is left free.

I claim

1. An automatic turret lathe comprising
a bedplate;
a main spindle having an axis of rotation for rotating a workpiece;
a headstock on the bedplate carrying the main spindle;
a tailstock slidably arranged on the bedplate and spaced longitudinally from the headstock;
a main turret which is indexable about an indexing axis oriented transverse to said axis of rotation and has a plurality of main tool carriers;
a removable supplementary turret disposed on the same indexing axis as the main turret and having a plurality of supplementary tool carriers arranged so as to form pairs with respective main tool carriers, the supplementary tool carriers being closer to the indexing axis than the main tool carriers; and
a support on which both turrets are mounted and which is slidable in longitudinal and transverse directions on the bedplate.

2. The lathe of claim 1 with internally machining tools received in at least some of the supplementary tool carriers 3. The lathe of claim 2 with, in at least one pair of tool carriers, an externally machining tool in the main tool carrier and an internally machining tool in the supplementary tool carrier so that the tools in said pair of the tool carriers can be used as a combination tool.

4. The lathe of claim 3, wherein the tools in the supplementary tool carriers are longer than the tools in the main tool carriers so that the cutting edges of the tools are at approximately the same distance from the indexing axis.

5. The lathe of claim 2, with, in at least one pair of tool carriers, internally machining tools received in both tool carriers and the two tool carriers being spaced from each other along the indexing axis by a distance which is greater than the radius of a chuck on the main spindle for holding a workpiece, or of the largest workpiece.

6. The lathe of claim 1, wherein said support comprises a carriage longitudinally movable on the bedplate, and a holder for the turrets movable transversely to the longitudinal direction.

7. The lathe of claim 6, including a workpiece guide with a guide bush disposed on said carriage and between the headstock and the turrets for movement in the longitudinal direction with the turrets.

8. The lathe of claim 1, wherein the number of main tool carriers is greater than the number of supplementary tool carriers, but is not a whole multiple of the number of supplementary tool carriers.

9. The lathe of claim 1, wherein the number of main tool carriers is at least one more than double the number of supplementary tool carriers.

10. The lathe of claim 1, wherein there are fourteen main tool carriers and six supplementary tool carriers.

11. The lathe of claim 1, wherein internally machining tool and externally machining tools are inserted alternately in the main tool carriers.

12. An automatic turret lathe comprising
a bedplate;
a main spindle for rotating a workpiece;
a headstock on the bedplate carrying the main spindle;
a main turret which is indexable about an indexing axis and has a plurality of main tool carriers;
a removable supplementary turret disposed on the same indexing axis as the main turret and having a plurality of supplementary tool carriers arranged so as to form pairs with respective main tool carriers, the supplementary tool carriers being closer to the indexing axis than the main tool carriers; and
a support on which both turrets are mounted and which is slidable in longitudinal and transverse directions on the bedplate.

* * * * *